US006766770B1

(12) United States Patent
Voorhees

(10) Patent No.: US 6,766,770 B1
(45) Date of Patent: Jul. 27, 2004

(54) SURE STAY SYSTEM

(75) Inventor: Rob Voorhees, Frankfort, KY (US)

(73) Assignee: Voorhees and Compnay LLC, Frankfort, KY (US)

( * ) Notice: Subject to any disclaimer, the term of this patent is extended or adjusted under 35 U.S.C. 154(b) by 0 days.

(21) Appl. No.: 10/351,825

(22) Filed: Jan. 27, 2003

(51) Int. Cl.$^7$ ................................................. A01K 1/04
(52) U.S. Cl. .......................................... 119/786; 52/156
(58) Field of Search ................................ 119/786, 787, 119/791; 52/156, 165; 114/230.16; 135/118

(56) References Cited

U.S. PATENT DOCUMENTS

| 556,798 | A |   | 3/1896 | Ashton |   |
|---|---|---|---|---|---|
| 656,053 | A |   | 8/1900 | Shaffer |   |
| 1,120,041 | A | * | 12/1914 | Dunn | 119/790 |
| 1,579,294 | A | * | 4/1926 | Fisk | 473/147 |
| 2,713,327 | A |   | 7/1955 | West |   |
| 2,922,211 | A | * | 1/1960 | Boyd | 411/551 |
| 3,042,161 | A |   | 7/1962 | Meyer Jr. |   |
| 3,189,004 | A |   | 6/1965 | Sinclair |   |
| 3,658,037 | A |   | 4/1972 | Hunter | 119/121 |
| 4,497,152 | A |   | 2/1985 | Weissner |   |
| 5,044,323 | A |   | 9/1991 | Papak | 119/121 |
| 5,353,747 | A |   | 10/1994 | Fain | 119/780 |
| 6,606,829 | B2 | * | 8/2003 | Benincasa et al. | 52/155 |

* cited by examiner

Primary Examiner—Charles T. Jordan
Assistant Examiner—Bret Hayes

(57) ABSTRACT

A system of locking mechanisms having numerous male locking mechanisms 16–20 within a inner tubular member and one female locking mechanism 22 that creates a singular point of entrance and exit within an outer tubular to secure dogs or pets. The male locking mechanisms 16–20 are a part of an inner-sleeve that is easily inserted into an outer-sleeve of which the female locking mechanism 22 is a part. The hollow metal outer-sleeve is inserted into the ground adjacent to ground level by hammering it into the ground using a plug-like structure that is inserted into the outer-sleeve. The plug like structure is then removed allowing the inner-sleeve to be inserted. The system of locking mechanisms inherent within the inner-sleeve and the outer-sleeve provide improved retaining capabilities while other features of the device allow for easy pivoting for pets, ready movement to additional locations, water resistant features, ground level adjacency for mowing and safety are maintained.

12 Claims, 5 Drawing Sheets

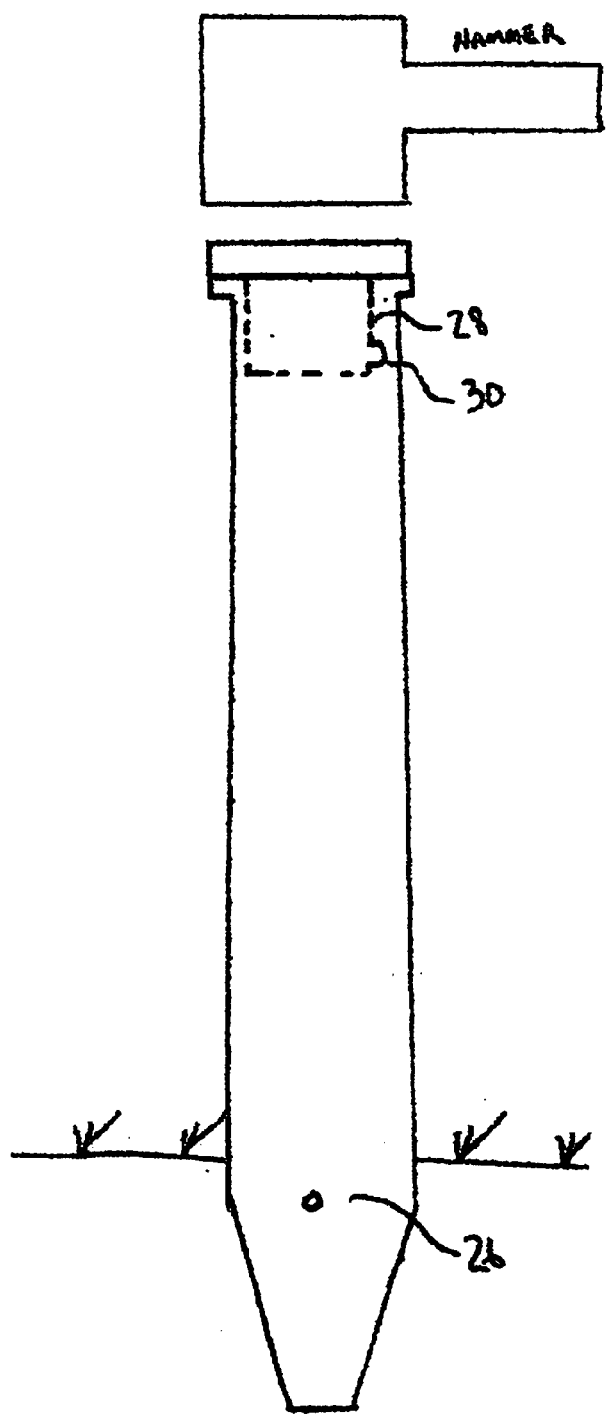
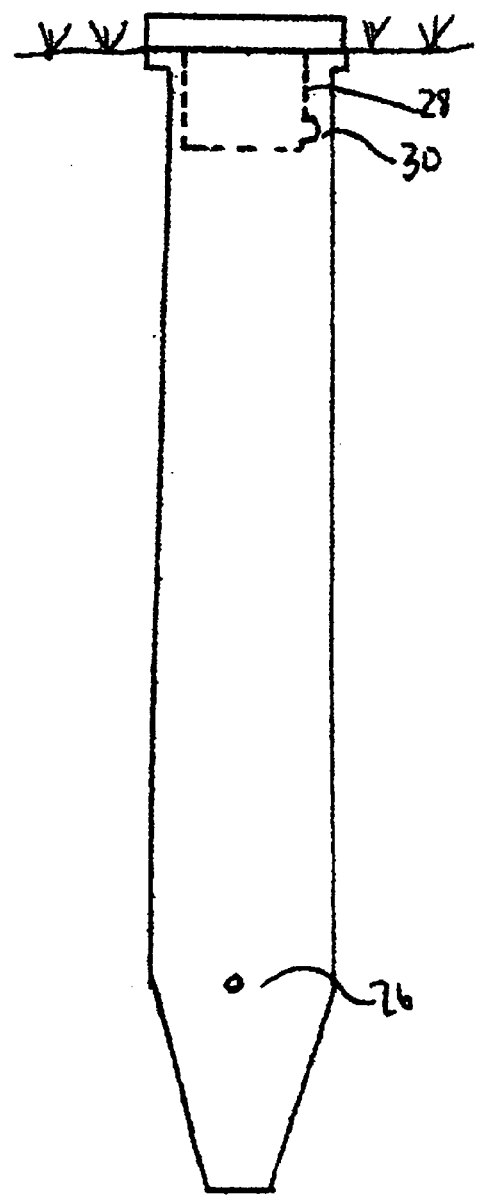

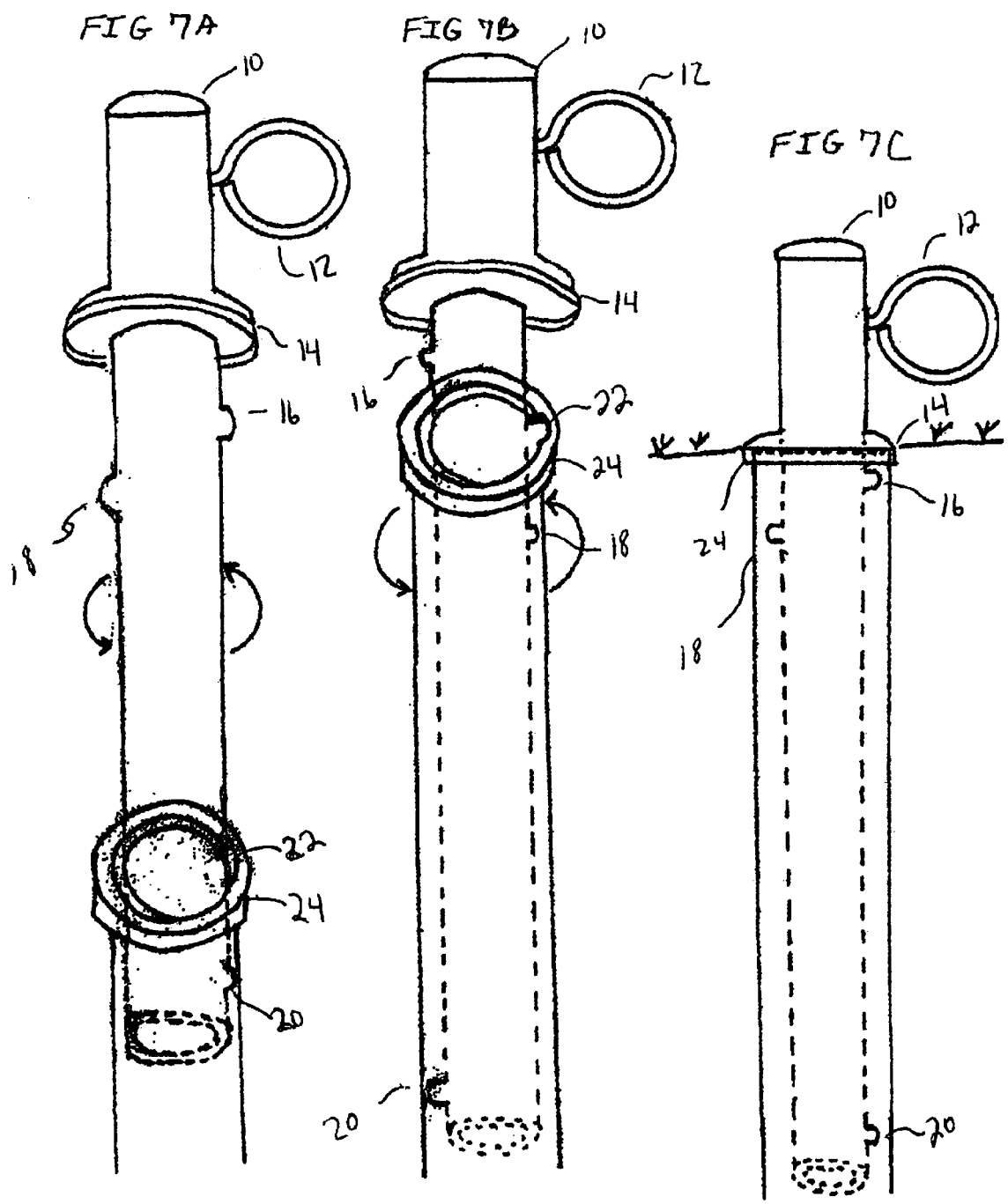

SURE STAY SYSTEM

BACKGROUND

1. Field of Invention

This invention relates to animal husbandry specifically to effective locking mechanisms within retaining devices for pets commonly known as tie-outs.

2. Description of Prior Art

The plethora of previous designs, configurations, and inventions pertaining to dog leashes and retaining devices has made tremendous progress toward a truly comprehensive approach to retaining pets while allowing them to pivot 360 degrees, remain secured, while providing a safe means to mowing lawns and maintaining a "flush" surface with the ground when "inner-sleeves" are removed. Prior art almost accomplishes this goal. However, the locking mechanisms inherent in the prior art prevent them from accomplishing all five of the most important characteristics of safe and easy retention at one time. Those characteristics are: it must easily pivot 360 degrees to prevent tangling, remain adjacent to the ground level once the inner-sleeve is removed for child safety and ease of mowing, effectively prevent the dog from pulling out the inner-sleeve while providing a means to "disengage" the upward motion of the inner-sleeve when it is inadvertently initiated by the dog or pet, provide plurality of outer-sleeves for ready movement and transition to other locations, and to provide a water resistant approach to enhance product longevity.

Any one prior invention accomplishes one or more of these objectives, however, not one of the previous inventions accomplishes all five of these objectives. Thus the need for a cost effective new invention that includes the advantages of prior art, greatly reduces the disadvantages, and provides a means for aggressive competition to the primitive tie-outs that currently saturate the pet industry becomes evident.

Perhaps the five closest resemblances are U.S. Pat. Nos. 4,982,701 and 5,044,323 to Papak, U.S. Pat. No. 3,658,037 to Hunter, U.S. Pat. No. 5,353,747 to Fain, and U.S. Pat. No. 3,042,161 to Meyer Jr. Certainly others contain similar features as the aforementioned such as U.S. Pat. No. 3,189,004 to Sinclair, U.S. Pat. No. 4,060,244 to Graham, and perhaps even U.S. Pat. No. 4,497,152 to Weissner. However, the five aforementioned suffice to vividly establish the need for a more comprehensive approach to the aforementioned five most important characteristics with particular emphasis on the locking mechanisms.

While Papak's designs are certainly an improvement in some respects they still leave two inherent problems. Most importantly his spiral or threading approach demands that the tubular member as seen in FIG. 3 and FIG. 5 remain above the surface of the ground and not adjacent to the ground surface. Obviously this impedes to some degree one's ability to mow safely even though it is low to the ground it is not "flush". It also allows for an unsafe environment for children that could trip over it. Secondly, Papak's most recent design on rare occasion could become dislodged if the dog creates a whip effect on the leash and consequently raises the stake just enough to engage it with the spiral ridge.

At this moment the dog need only to continue in circular motion to dislodge the stake. Certainly this would be difficult. Papak accomplishes three of the five objectives but slightly misses providing a means to automatically disengage inadvertent upward motion, and creates a potentially more unsafe environment by allowing the tubular member to remain above the surface of the ground.

While Hunter's work is an improvement over prior art particularly in its ability to pivot freely it does not contain any specific means to ensure that the rod portion of his device cannot come out of the sleeve. His design relies on the weight of the rod to prevent inadvertent upward removal. Therein lay two inherent dilemmas. First, anyone skilled in the field would readily ascertain that while the weight of the rod is a deterrent to inadvertent upward removal it is still very possible for a dog to create inadvertent upward motion and bend the inner tubular member. Secondly, the solid rod can be costly thus deterring major manufacturers from investing in mass production. Ultimately this discourages competition to the very basic tie-outs that currently dominate the market.

The presence of an effective locking mechanism would allow for less dependence on such heavy solid material and decrease costs while improving the security of the device.

Fain like Hunter certainly provided some improvement over prior art but lacked the provision for an effective locking mechanism to prevent inadvertent upward motion and removal.

Meyer Jr. produced a very effective means anchoring. However, it cannot pivot 360 degrees in either the above the ground position or the adjacent ground position because of it inherent need to lock into place. For this reason it becomes impractical for retaining animals because it cannot pivot continually.

While some prior art provides pivoting capabilities, ground level adjacency, limited locking capabilities, plurality for ready movement, and water resistant concepts, none of the prior art effectively combines all of these characteristics into one device with particular attention drawn to the area of the locking systems. It is therefore the primary object of this invention to provide a more effective locking system for the device that decreases the likelihood of the inadvertent upward motion of the inner tubular member while including all of the advantages of prior art without the described disadvantages. It also the object of this invention to provide an adequate device that is economical enough to compete with the existing commercially available tie-out stale that provide only few of the above advantages and many of the above disadvantages.

BRIEF DESCRIPTION OF THE DRAWINGS

FIG. 6A Depicts the protector plug inserted into the inner-sleeve after having aligned the male and female locking mechanisms to become prepared for insertion into the ground.

FIG. 6B Depicts the inner-sleeve fully installed into and flush with the ground.

FIG. 7A Depicts the inner-sleeve after the first male locking mechanism 20 has passed though the female locking mechanism 22 with particular attention drawn to the opposing male locking mechanism 18 and its opposite position and noticeable inability to align with the singular point of entrance 22 without adequate rotation FIG. 7B Depicts the inner-sleeve after the second locking mechanism 18 has passed through the female locking mechanism 22 using the same method as outlined for FIG. 7A with particular attention drawn to both male locking mechanisms 20 and 16 which once again are at opposite positions of the aligned locking mechanism 18 and therefore disallowed from alignment with the singular point of entrance and exit.

FIG. 7C Depicts the inner-sleeve after the third male mechanism 16 has passed through the female locking mechanism 22 with particular attention drawn to male mechanism 18 which at an opposite position and disallowed form point of entrance and exit

REFERENCE NUMERALS

10 Inner-sleeve Protector Cap
12 Retaining Ring
14 Male Outer-sleeve cover
16 Male Locking Mechanism C
18 Male Locking Mechanism B
20 Male Locking Mechanism A
22 Female Locking Mechanism
24 Female Inner-sleeve bolder
26 Drain Hole
28 Protector Plug
30 Male Locking Mechanism for Protector Plug

DESCRIPTION OF THE PREFERRED EMBODIMENT

Figure 1:
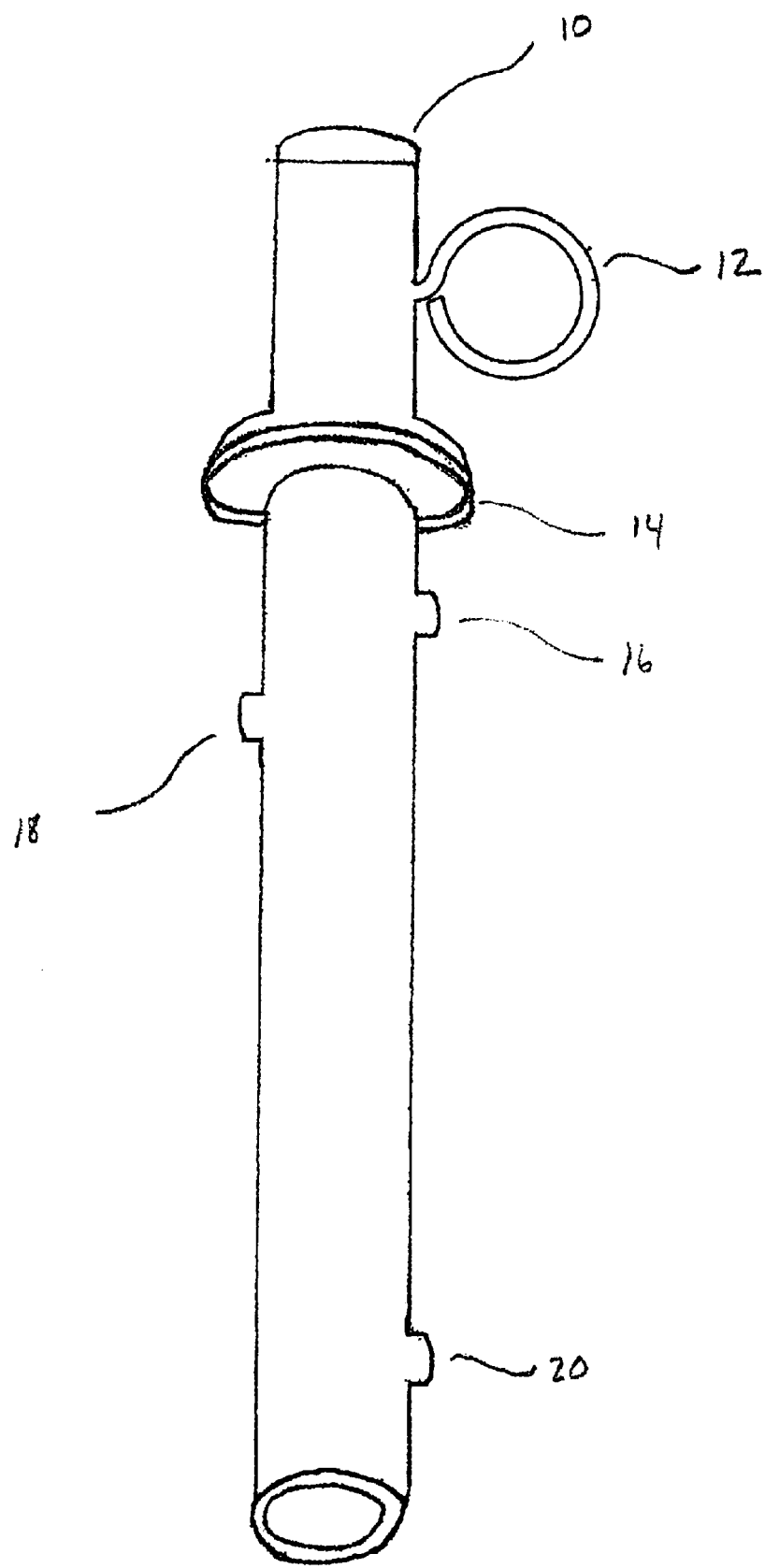
FIG. 1 Depicts the entire inner-sleeve and its components with special emphasis drawn to reference numbers 16, 18, and 20 the male locking mechanisms.
Figure 2:
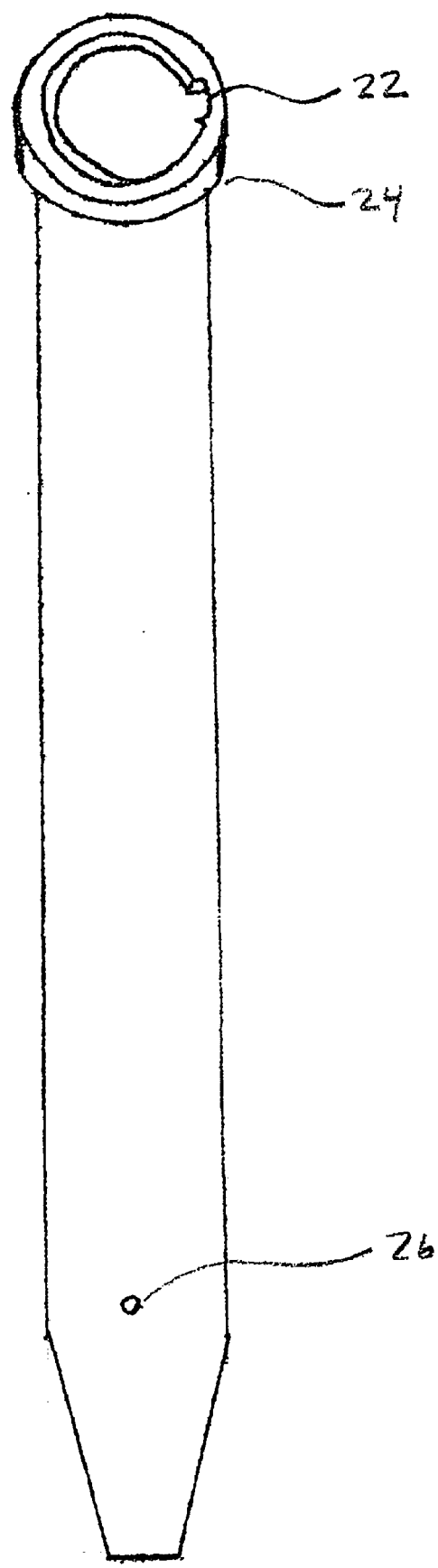
FIG. 2 Depicts the outer-sleeve into which the inner-sleeve is inserted with primary emphasis on 22 and secondary emphasis on 24 which together create the singular point of entrance and exit while simultaneously disallowing entrance and exit at any other portion other than the female component 24
Figure 3:
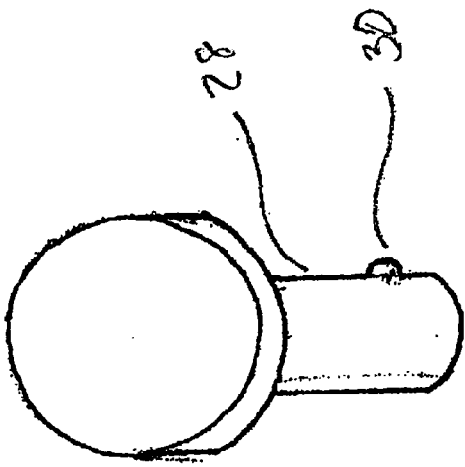
FIG. 3 Depicts the protector plug, the component used to insert into the inner-sleeve during installation and more consistently to prevent debris and water from infiltrating the outer-sleeve once the inner-sleeve is removed FIG. 4 Depicts a standalone look at the female inner-sleeve holder to emphasize the rim-like structure's ridge effect that disallows entry or exit of male components while simultaneously allowing entry and exit at the slot or notch at the top which is the female locking mechanism.
Figure 5:
FIG. 5 Depicts the inner-sleeve protector cap designed to keep rain and debris out of the uppermost portion of the device.
Figure 4:
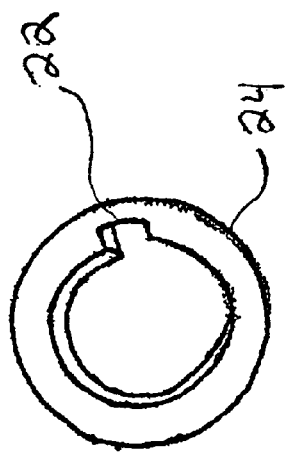

A typical embodiment of the device is comprised of an outer-sleeve FIG. 2 usually but not necessarily made of a hollow metal substance into which an inner-sleeve FIG. 1 is inserted by using a protector plug FIG. 3. The protector plug FIG. 3 is comprised of metal for installation with a protector plug male locking mechanism 30 to aid in securing the protector plug FIG. 3 within the outer-sleeve FIG. 2 during installation. A rubber or plastic version of this protector plug FIG. 3 is also included to eliminate rust when it is used in the absence of the inner-sleeve FIG. 2. The outer-sleeve FIG. 2 once inserted into the ground becomes the base for the inner-sleeve FIG. 1. Because of the physics of this device once the outer-sleeve FIG. 2 is inserted into the ground one must dig it up similar to digging up a tree. The outer-sleeve FIG. 2 contains at its upper rim a notch called the female locking mechanism 22. It is simply a notch cut into the metal to allow the extended metal pieces called male locking mechanisms 16–20 of the inner-sleeve FIG. 1 to pass though this section of the outer-sleeve FIG. 2. If the male locking mechanisms 16–20 do not pass through this section when entering or removing the inner-sleeve FIG. 1 the inner-sleeve FIG. 1 cannot be installed or removed. Notice that there is only one point of entrance the female locking mechanism 22. Also notice that the three male locking mechanisms 16–20 are arranged with a staggered effect. This staggered effect is the essence of the invention. Perhaps an illustration at this moment would help the readers envision its effect.

Imagine a doorway that can only allow one individual to pass through it at a time. Two individuals are on one side of the doorway and one individual is on the other side of the doorway. One of the individuals of the two must pass first, the individual on the other side passes second, the last of the two individuals from the original side passes last This is the relationship that the male locking mechanisms 16–18 have with female locking mechanism 22 as the "doorway". A dog would have to perfectly align male locking mechanism 16 with female locking mechanism 22, remain in mid air and levitate an additional approximate 1 inch while pivoting 180 degrees around the center of the device to perfectly align the second male locking mechanism 18 with female locking mechanism 22, then levitate an additional approximate 18 inches while pivoting 180 degrees around the center of the device and perfectly align the third male locking mechanism 20 with female locking mechanism 22 to inadvertently remove the inner-sleeve. Another reason this is virtually impossible is the inherent ability of this locking system to "disengage" an inadvertent upward motion. For example, if the animal creates inadvertent upward motion as to allow the male locking mechanism 16 to pass through the female locking mechanism 22 and "rest" on a female inner-sleeve holder 24 then once the device rotates or pivots 180 degrees horizontally then the inner-sleeve will "drop" once the male locking mechanism 16 aligns with the female locking mechanism 22. Although this current embodiment contains three male locking mechanisms, this concept can extend to other applications besides the pet industry and therefore include more or less than three male locking mechanisms whether within or outside the scope of pet products. Additionally, the outer-sleeve contains a hole for draining 26 which is optional and the rim like structure called a female inner-sleeve holder 24. Although the device is approximately 24 inches long and primarily used for dogs. The device will also be made in smaller and larger versions for smaller dogs and other pets even horses, and other industries requiring such tethering and anchoring combinations. The inner-sleeve FIG. 1 is shaped to include a kind of inverse cup called the male outer-sleeve cover 14. This is designed to prevent rain and debris from infiltrating the inner-sleeve FIG. 1, and to allow 360 degrees pivoting movement for the dog. It overlies the female inner-sleeve holder 24. Also to disallow the debris and rain an inner-sleeve protector cap 10. The dog is chained to an eyebolt similarity called the retaining ring 12.

Operation

Perhaps the easiest way to introduce the operation of this invention is to view FIG. 1, the inner-sleeve and understand that it inserts into FIG. 2, the outer-sleeve. After this outer-sleeve FIG. 2 is inserted into the ground until flush with the ground surface by using FIG. 3, the protector plug to hammer it into the ground. FIG. 3 the protector plug is made of one of two types of material, steel and rubber. The steel protector plug is used to insert into FIG. 2 the outer-sleeve after aligning a protector plug male locking mechanism 30 with a female locking mechanism 22 and inserting. After the protector plug FIG. 3 is inserted into the outer-sleeve FIG. 2 one then hammers the outer-sleeve into the ground hammering on the upper portion of the protector plug. This is to protect the walls of the outer-sleeve from becoming damaged from those inexperienced with a hammer. A rubber protector plug will be discussed later. After the outer-sleeve FIG. 2 is inserted flush with the ground an inner-sleeve FIG. 1 is then inserted into the outer-sleeve after the protector plug FIG. 3 is removed. To insert the inner-sleeve FIG. 1 one aligns the male locking mechanism 20 with the female locking mechanism 22 and inserts the inner-sleeve FIG. 1 until a second male locking mechanism 18 touches a female inner-sleeve holder 24. One then rotates the inner-sleeve FIG. 1 180 degrees until this second male locking mechanism 18 is aligned with the female locking mechanism 22 and "drops" then one inserts the inner-sleeve until a third male locking mechanism 16 touches the female inner-sleeve holder 24. One then rotates the inner-sleeve FIG. 1 180 degrees once again, this time until the male locking mechanism 16 is aligned with the female locking mechanism 22. One then allows the inner-sleeve to "drop" into place. At this time the device is ready to hold a dog once the dog is attached to a retaining ring 10 located on the outer-sleeve FIG. 2. Notice that on the inner-sleeve FIG. 1 there is a male outer-sleeve cover 14 which overlays the female inner-sleeve holder 24 once the inner-sleeve FIG. 1 is inserted into the outer-sleeve FIG. 2. This is designed to decrease the likelihood of rain and debris from infiltrating the inner-sleeve FIG. 1 and to allow the device to pivot freely 360 degrees Also notice an inner-sleeve protector cap 10 also designed to keep out rain and debris. When one wants to mow the lawn simply remove the inner-sleeve FIG. 1 and insert the protector plug FIG. 3. This time however, one would most likely use the rubber protector plug. (The device will come with both a steel protector plug and a rubber one). Lastly, just the outer-sleeves FIG. 2 will be sold as well. A steel and rubber protector plug will be included. This additional purchase of an outer-sleeve FIG. 2 will allow plurality and ready movement to relocate a dog to other locations within seconds without the need to reinstall the entire device. This is accomplished merely by inserting an outer-sleeve FIG. 2 into the ground as outlined above and keeping the rubber protector plug FIG. 3 in it until one needs to use this location.

Concludion, Ramification, and Scope

To reiterate some dynamics of the invention and the unique and novel components one would review Locking Mechanism 20, Locking Mechanism 18, Locking Mechanism 16, and Female Locking Mechanism 22. As noted in the prior art section some of the previous devices although similar in some respects to the Sure Stay System did not offer a way to ensure the outer-sleeve to be flush with the ground when the inner-sleeve was removed. This problem could be dangerous for running children that could trip over it and it could be dangerous if the top portion of it was a little too far above the ground while mowing. Notice that on the inner-sleeve FIG. 1 however, all three locking mechanisms 16–20 are underneath the portion of the outer-sleeve FIG. 2 that is adjacent to ground level. This means that once the inner-sleeve FIG. 1 is removed the outer-sleeve FIG. 2 is completely flush with the surface. This provides the safety for mowing and recreation. Also, the arrangement between the male outer-sleeve cover 14 and the female inner-sleeve cover 24 allow for easy pivoting and protection against infiltrating rain and debris. However, the primary distinction about this device versus prior an is the system of locking mechanisms. To reiterate there are three metal rods or beads that extend horizontally beyond the outside wall of the inner-sleeve FIG. 1 just enough as to not touch the inside wall of the outer-sleeve FIG. 2 once the inner-sleeve FIG. 1 is inserted into the outer-sleeve FIG. 2. They are strategically placed two on one side and one on the opposing side and staggered as illustrated in the drawing. This design is the primary emphasis of this patent for a number of reasons: A) A dog must first perfectly align the first male locking mechanism A 20. Then the dog must pivot 180 degrees and elevate while in the air to perfectly align the second male locking mechanism 18. Last the dog must elevate an additional 18 inches, pivot 180 degrees and perfectly align the third male locking mechanism 16 and then remove the inner-sleeve. Furthermore, if a dog or animal could inadvertently create an upward motion as to allow the male locking mechanism 16 to pass through female locking mechanism 22 and rest on the female inner-sleeve holder 24, once the inner-sleeve rotates 180 degrees the male locking mechanism 16 will realign with the female locking mechanism 22 and "drop into realignment". While it is virtually impossible for an animal to inadvertently remove the device, it is very simple for a human to remove the inner-sleeve with three simple rotations (just the reverse of the above mentioned procedure). This in essence, is the advantage of Sure Stay. It provides a more effective locking system along with all of the advantages of prior art without the aforementioned disadvantages.

While the above description contains many specificities these should not be construed as limitations to the scope of the invention, but rather as an exemplification of one preferred embodiment thereof. Many other variations are possible. Materials other than metal can be used for the sleeves, the sleeves can be solid rather than hollow, more than three male locking mechanisms can be used, less than three male locking mechanisms may be used (although the ability to inadvertently create upward motion is greatly enhanced), varying retaining ring designs can be substituted, and the concept of the locking systems can be used in multiple industries with shapes other than rods or sleeves. Accordingly, the scope of the invention should be determined not by embodiment(s) illustrated, but by the appealed claims and their legal equivalents.

What is claimed is:

1. A tether device for restraining animals in a defined area, the device comprising:
   first and second cylindrical, elongate members, the first member being hollow including inner and outer surfaces;
   the first member having a top end including a first annular ring having an outer diameter greater than a diameter of the outer surface and an inner diameter less than a diameter of the inner surface, a thickness and a notch extending through the thickness;
   the first member further including a bottom end having a taper reducing the diameters of the inner and outer surfaces to end in a blunted point;
   the second member having first and second ends, the second member further including first, second and third protrusions and an outer diameter sized to allow passage of the second member through the inner diameter of the ring of the first member;
     the first end including the first protrusion, the first protrusion protruding from a diameter of the first end proximate the first end and being sized to allow passage of the first protrusion through the notch of the first member;
   the second end including a sleeve cover having a retaining ring;
     the sleeve cover comprising an inner diameter sized to compressively fit over an outer diameter of the second end and a second annular ring to support the second member when fully inserted into the first member;

the second end further comprising the second protrusion located below the second annular ring by a distance greater than the thickness of the first annular ring, the second protrusion being similar in construction to and in line with the first protrusion along a longitudinal axis of the second member;

the second end further comprising the third protrusion, the third protrusion being similar in construction to the first and second protrusions and being spaced apart from the second protrusion in a direction toward the first protrusion but nearer the second protrusion than the first protrusion, the third protrusion also being located diametrically opposed to the first and second protrusions on the outer surface of the second member.

2. The device of claim 1 wherein the second member is hollow.

3. The device of claim 1 further including a protector plug being cylindrical and having first and second ends;

the first end having a diameter being greater than the inner diameter of the first ring; and the second end having a diameter being less than the inner diameter of the first ring.

4. The device of claim 2 wherein the second end further includes a fourth protrusion, the fourth protrusion being similar in construction to the first, second and third protrusions.

5. A The device of claim 1 wherein the bottom end of the first member has at least one aperture about at a point where the taper begins to reduce the diameters and substantially perpendicular to the longitudinal axis of the first member, the aperture being of a size to allow drainage but not significantly reduce structural integrity.

6. The device of claim 1 wherein the protrusions prevent movement of the second member in the longitudinal directions of the first and second members unless aligned for passage through the notch.

7. The device of claim 3 wherein the protrusion prevents movement of the plug in the longitudinal direction of the first member unless aligned for passage through the notch.

8. The device of claim 1 wherein the notch is formed parallel to a longitudinal axis of the first member and passes completely through the ring from the inner diameter of the ring and terminates at the diameter of the inner surface.

9. The device of claim 1 wherein the second end of the second member includes a protective cap.

10. The device of claim 1 wherein the device is made of metal.

11. The device of claim 3 wherein the plug is made of metal.

12. The device of claim 3 wherein the plug is made of hard rubber.

* * * * *